(12) United States Patent
Zhong et al.

(10) Patent No.: US 7,474,967 B2
(45) Date of Patent: Jan. 6, 2009

(54) COMPUTER-IMPLEMENTED METHODS, CARRIER MEDIA, AND SYSTEMS FOR DETECTING DEFECTS ON A WAFER BASED ON MULTI-CORE ARCHITECTURE

(75) Inventors: Lei Zhong, Parker, TX (US); John McCormack, West Lothian (GB)

(73) Assignee: KLA-Tencor Technologies Corp., Milpitas, CA (US)

( * ) Notice: Subject to any disclaimer, the term of this patent is extended or adjusted under 35 U.S.C. 154(b) by 0 days.

(21) Appl. No.: 11/759,580

(22) Filed: Jun. 7, 2007

(65) Prior Publication Data

US 2008/0306701 A1 Dec. 11, 2008

(51) Int. Cl.
G06F 19/00 (2006.01)

(52) U.S. Cl. ............ 702/35; 257/777; 356/237.5; 356/243.4; 714/30

(58) Field of Classification Search ............ 702/33, 702/35, 117; 348/126; 382/141, 144, 145, 382/154; 356/237.2, 237.4, 237.5, 243.4, 356/398; 324/765; 257/777; 714/30, 733, 714/736
See application file for complete search history.

(56) References Cited

U.S. PATENT DOCUMENTS

| | | | |
|---|---|---|---|
| 4,247,203 A | 1/1981 | Levy et al. | |
| 4,805,123 A | 2/1989 | Specht et al. | |
| 4,845,558 A | 7/1989 | Tsai et al. | |
| 5,383,018 A * | 1/1995 | Sadjadi ............ | 356/243.4 |
| 5,732,209 A * | 3/1998 | Vigil et al. ............ | 714/30 |
| 5,825,482 A | 10/1998 | Nikoonahad et al. | |
| 7,068,363 B2 * | 6/2006 | Bevis et al. ............ | 356/237.5 |
| 2008/0018887 A1 * | 1/2008 | Chen et al. ............ | 356/237.2 |
| 2008/0054489 A1 * | 3/2008 | Farrar et al. ............ | 257/777 |

OTHER PUBLICATIONS

Landzberg, A. "Microelectronic Manufacturing Diagnostics Handbook," 1993, Published by Van Nostrand Reinhold, New York, NY.

* cited by examiner

Primary Examiner—John H Le
(74) Attorney, Agent, or Firm—Baker & McKenzie LLP

(57) ABSTRACT

Computer-implemented methods, carrier media, and systems for detecting defects on a wafer based on multi-core architecture are provided. One computer-implemented method for detecting defects on a wafer includes acquiring output for the wafer generated by an inspection system. Dies are formed on the wafer, and multiple cores are formed in the dies. The method also includes detecting defects on the wafer by comparing the output for a first of the multiple cores to the output for a second of the multiple cores. The first and second of the multiple cores are formed in the same die, different dies, or the same die and different dies.

20 Claims, 4 Drawing Sheets

FIG. 2
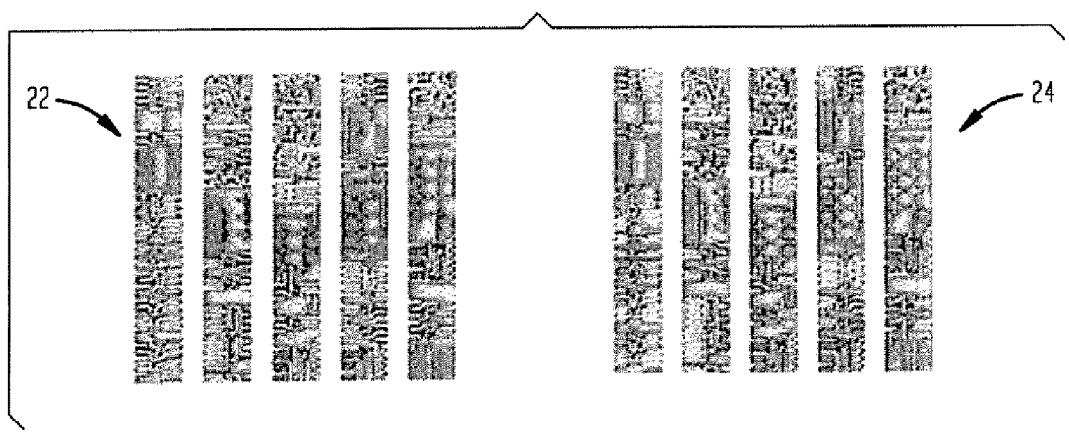
FIG. 3
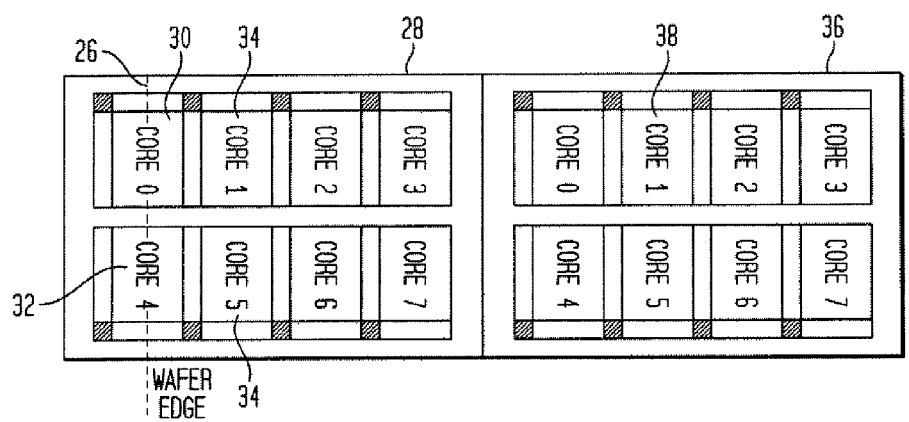
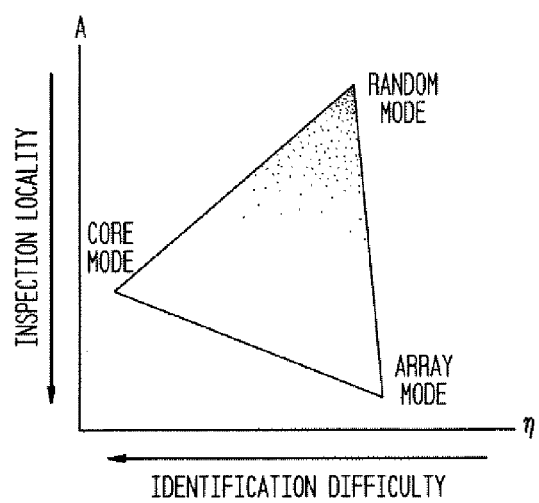
FIG. 4

COMPUTER-IMPLEMENTED METHODS, CARRIER MEDIA, AND SYSTEMS FOR DETECTING DEFECTS ON A WAFER BASED ON MULTI-CORE ARCHITECTURE

BACKGROUND OF THE INVENTION

1. Field of the Invention

This invention generally relates to computer-implemented methods, carrier media, and systems for detecting defects on a wafer based on multi-core architecture. Certain embodiments relate to detecting defects on a wafer by comparing output generated by an inspection system for a first of multiple cores to output generated by the inspection system for a second of the multiple cores, which is formed in the same die, different dies, or the same die and different dies on the wafer as the first of the multiple cores.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a reticle to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices such as integrated circuits. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Many different types of inspection tools have been developed for the inspection of semiconductor wafers. Defect inspection is currently being performed using techniques such as bright field (BF) imaging, dark field (DF) imaging, and scattering. The type of inspection tool that is used for inspecting semiconductor wafers may be selected based on, for example, characteristics of the defects of interest and characteristics of the wafers that will be inspected. For example, some inspection tools are designed to inspect unpatterned semiconductor wafers or patterned semiconductor wafers.

Patterned wafer inspection is of particular interest and importance to the semiconductor industry because processed semiconductor wafers usually have a pattern of features formed thereon. Although inspection of unpatterned wafers, or "monitor wafers," which have been run through a process tool, may be used as a gauge for the number and types of defects that may be found on patterned wafers, or "product wafers," defects detected on monitor wafers do not always accurately reflect the defects that are detected on patterned wafers after the same process in the same process tool. Inspection of patterned wafers is, therefore, important to accurately detect defects that may have been formed on the wafer during, or as a result of, processing. Therefore, inspecting patterned wafers or product wafers may provide more accurate monitoring and control of processes and process tools than inspection of monitor wafers.

As design rules shrink, semiconductor manufacturing processes may be operating closer to the limitations on the performance capability of the processes. In addition, smaller defects can have an impact on the electrical parameters of the device as the design rules shrink, which drives more sensitive inspections. Therefore, as design rules shrink, the population of potentially yield relevant defects detected by inspection grows dramatically, and the population of nuisance defects detected by inspection also increases dramatically. Therefore, more and more defects may be detected on the wafers, and correcting the processes to eliminate all of the defects may be difficult and expensive. In some instances, the number of noise and nuisance events detected by an inspection tool can be reduced by using optimized data acquisition parameters and optimized data processing parameters. In addition, the number of noise and nuisance events can be reduced by applying various filtering techniques to the inspection results.

Process variation has been known for a long time to be a limiting factor of inspection sensitivity. Every process exhibits some degree of variation. Process variation can be either controllable or uncontrollable. A controllable variation may become uncontrollable as device scaling reaches a certain point. Process variation can be tolerable (within spec) or intolerable (out-of-spec). Detection of relatively small defects requires suppression of the background noise from both "tolerable" and intolerable variations. In particular, background noise from both types of process variation will decrease the signal-to-noise of defects in inspection output, which can prevent the detection of relatively small defects, thereby reducing the sensitivity of the inspection.

Accordingly, it would be advantageous to develop computer-implemented methods, carrier media, and/or systems for detecting defects on a wafer that can suppress noise from process variations across the wafer thereby increasing the sensitivity of the inspection particularly for relatively small defects.

SUMMARY OF THE INVENTION

The following description of various embodiments of computer-implemented methods, carrier media, and systems is not to be construed in any way as limiting the subject matter of the appended claims.

One embodiment relates to a computer-implemented method for detecting defects on a wafer. The method includes acquiring output for the wafer generated by an inspection system. Dies are formed on the wafer, and multiple cores are formed in the dies. The method also includes detecting defects on the wafer by comparing the output for a first of the multiple cores to the output for a second of the multiple cores. The first and second of the multiple cores are formed in the same die, different dies, or the same die and different dies.

In one embodiment, the multiple cores have a period in the dies greater than a period of repetitive patterned features formed in the dies. In another embodiment, the first and second of the multiple cores are located adjacent to each other in the same die. In an additional embodiment, the first and second of the multiple cores are not located adjacent to each other in the same die.

In one embodiment, the first and second of the multiple cores are homogenous multiple cores. In another embodiment, the comparing step includes comparing substantially an entirety of the first of the multiple cores to substantially an entirety of the second of the multiple cores. In an additional embodiment, the comparing step is not performed based on periodicity and repeatability of patterned features formed in the multiple cores.

In one embodiment, results of the comparing step are independent of patterned features formed on a layer of the wafer underlying a layer of the wafer on which the defects are being detected. In another embodiment, noise in results of the comparing step caused by process variations across the wafer is substantially suppressed due to periodicity of the multiple cores. In an additional embodiment, noise in results of the comparing step caused by color variations across the wafer is substantially suppressed due to periodicity of the multiple cores.

In one embodiment, the first and second of the multiple cores are formed in a die located adjacent to an edge of the wafer. In one such embodiment, only a portion of the die located adjacent to the edge of the wafer is formed on the wafer. In one such embodiment, detecting the defects includes detecting the defects in the die located adjacent to the edge of the wafer.

In one embodiment, the method includes rotating the output for one of the first and second of the multiple cores prior to the comparing step. In another embodiment, the method includes translating the output for one of the first and second of the multiple cores prior to the comparing step. In an additional embodiment, the method includes rotating and translating the output for one of the first and second of the multiple cores prior to the comparing step.

In one embodiment, the method includes filtering the output prior to the comparing step using a filtering technique that has substantially the same symmetry as the multiple cores. In another embodiment, the method includes identifying a plane of mirror symmetry between the first and second of the multiple cores prior to the comparing step and aligning the first and second of the multiple cores to each other based on the plane of mirror symmetry prior to the comparing step.

In one embodiment, the output includes digitized images of the wafer. In another embodiment, the comparing step includes comparing individual pixels in the output for the first and second of the multiple cores to each other. In one such embodiment, the individual pixels that are compared to each other are located at corresponding positions across a plane of mirror symmetry between the first and second of the multiple cores. In an additional embodiment, the detecting step includes applying a threshold to results of the comparing step.

Each of the steps of the method described above may be performed as described further herein. In addition, each of the embodiments of the method described above may include any other step(s) of any other method(s) described herein. Furthermore, each of the embodiments of the method described above may be performed by any of the systems described herein.

Another embodiment relates to a carrier medium that includes program instructions executable on a computer system for performing a computer-implemented method for detecting defects on a wafer. The computer-implemented method includes acquiring output for the wafer generated by an inspection system. Dies are formed on the wafer, and multiple cores are formed in the dies. The method also includes detecting defects on the wafer by comparing the output for a first of the multiple cores to the output for a second of the multiple cores. The first and second of the multiple cores are formed in the same die, different dies, or the same die and different dies.

The carrier medium described above may be further configured as described herein. The steps of the computer-implemented method may be performed as described further herein. In addition, the computer-implemented method for which the program instructions are executable may include any other step(s) of any other method(s) described herein.

An additional embodiment relates to a system configured to detect defects on a wafer. The system includes an inspection system configured to generate output for the wafer. Dies are formed on the wafer, and multiple cores are formed in the dies. The system also includes a computer system configured to detect defects on the wafer by comparing the output for a first of the multiple cores to the output for a second of the multiple cores. The first and second of the multiple cores are formed in the same die, different dies, or the same die and different dies. The system may be further configured as described herein.

BRIEF DESCRIPTION OF THE DRAWINGS

Other objects and advantages of the invention will become apparent upon reading the following detailed description and upon reference to the accompanying drawings in which:

FIG. 2 is an optical image of one example of two adjacent dies formed on a wafer after a copper chemical-mechanical polishing (CMP) process performed on the wafer;

FIG. 3 is a schematic diagram illustrating a top view of one example of multiple dies formed on a wafer, multiple cores formed in the dies, and an edge of the wafer located within one of the multiple dies;

FIG. 4 is a schematic diagram illustrating the positioning of different inspection approaches as a function of inspection locality and identification difficulty;

Figure 1:
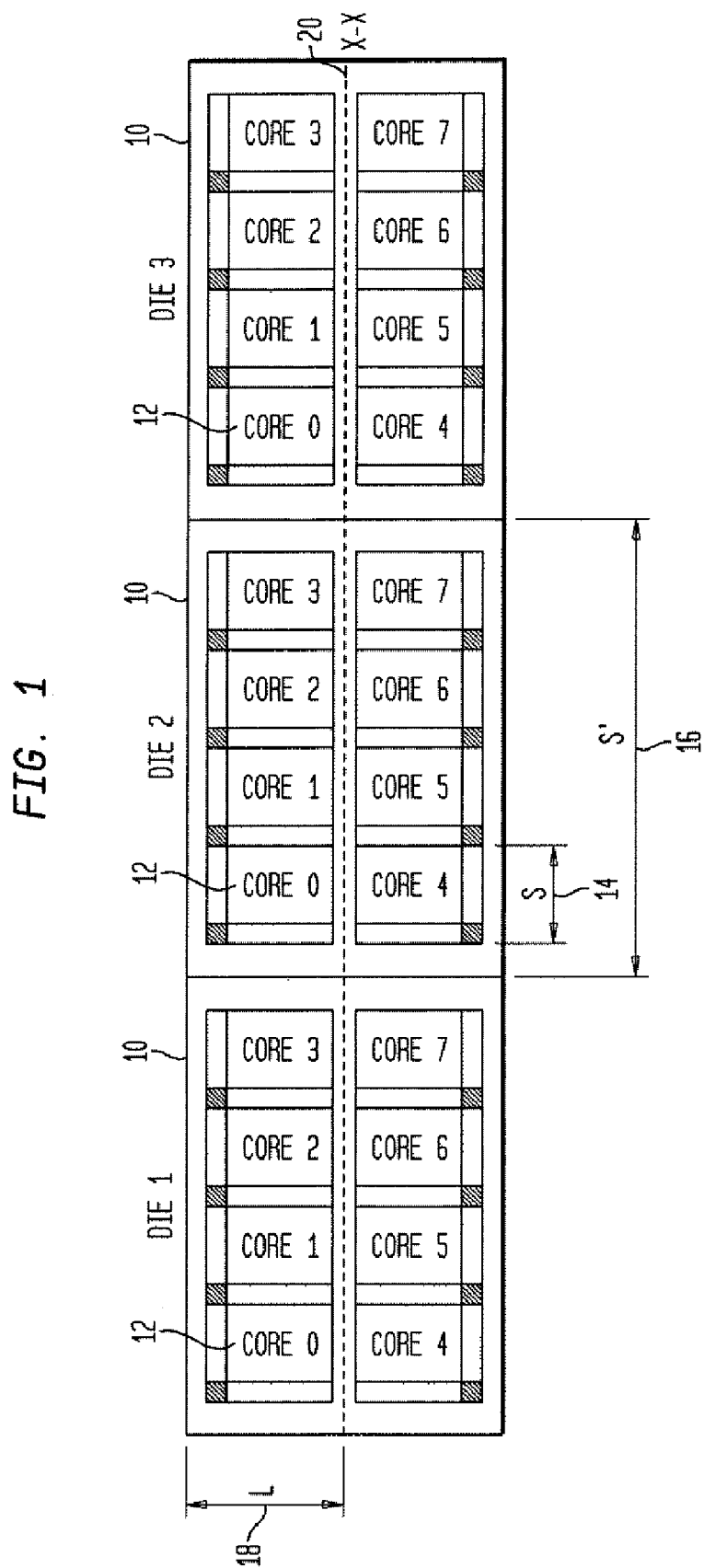
FIG. 1 is a schematic diagram illustrating a top view of one example of a floor plan of multiple dies formed on a wafer and multiple cores formed in the dies.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "wafer" generally refers to substrates formed of a semiconductor or non-semiconductor material. Examples of such a semiconductor or non-semiconductor material include, but are not limited to, monocrystalline silicon, gallium arsenide, and indium phosphide. Such substrates may be commonly found and/or processed in semiconductor fabrication facilities. One or more layers may be formed upon a wafer. For example, such layers may include, but are not limited to, a resist, a dielectric material, a conductive material, and a semiconductive material. Many different types of such layers are mown in the art, and the term wafer as used herein is intended to encompass a wafer on which all types of such layers may be formed.

One or more layers formed on a wafer may be patterned or unpatterned. For example, a wafer may include a plurality of dies, each having repeatable patterned features. Formation and processing of such layers of material may ultimately result in completed devices. Many different types of devices may be formed on a wafer, and the term wafer as used herein is intended to encompass a wafer on which any type of device known in the art is being fabricated.

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals.

The embodiments described herein generally relate to wafer inspection technology used during integrated circuit (IC) manufacturing. More specifically, the embodiments described herein are directed toward defect inspection on wafers containing IC chips with multi-core architecture.

The semiconductor industry has been for decades exploiting device scaling to achieve better performance at lower cost. At the 65 nm technology node and beyond, traditional device scaling is facing challenges imposed by fundamental limitations, such as device leakage runaway. Innovative scaling is invoked to meet the unprecedented challenges. Multi-core architecture is widely pursued to enable continuous performance improvement while keeping the power consumption under check.

Wafer inspection is the key to yield enhancement and management. Automatic defect detection has been achieved either through comparing one die on the wafer to another die on the same wafer or by making use of the patterns repeated in regular arrays. The approaches are generally referred to as random mode (die-based) and array mode, respectively.

The embodiments described herein are motivated by the rapid proliferation of multi-core architecture. The embodiments may be used as a multi-core architecture based wafer inspection method. One embodiment relates to a computer-implemented method for detecting defects on a wafer. The defects that are detected may include any of the defects described herein and any other defects of interest, which may vary depending on the wafer being inspected and/or the process performed on the wafer prior to inspection.

The method includes acquiring output for the wafer generated by an inspection system. In some embodiments, acquiring the output for the wafer includes generating the output for the wafer (e.g., collecting raw data for the wafer). The output may be generated using an inspection system as described further herein. In one embodiment, the inspection system includes a dark field inspection system. In this manner, the embodiments described herein can be performed using output generated by dark field inspection systems. The dark field inspection system may be configured for inspection of patterned wafers. In addition, the inspection system may be configured to acquire the output using multiple channels, which may be configured as described further herein. The inspection system may also or alternatively include a bright field inspection system. The inspection system used to generate the output may be configured as described further herein.

The output that is used in the embodiments described herein may include any suitable output that can be used in the methods described herein. For example, the output may include image data. In addition, the output that is acquired in this step may vary depending on the inspection system used to inspect the wafer. Furthermore, the output may include any of the output described further herein.

Acquiring the output for the wafer may, therefore, include using an inspection system (e.g., a dark field inspection system) to inspect a wafer. However, the computer-implemented method does not necessarily include inspecting the wafer. For example, the computer-implemented methods described herein may include acquiring the output described further herein from an inspection system used to inspect the wafer. In one such example, the computer-implemented methods described herein may acquire the output by receiving the output from a processor of the inspection system or retrieving the output from a storage medium (e.g., a storage medium included in the inspection system, a fab database, etc.) in which the inspection system stored the output of the inspection process. The output may have any suitable format known in the art (e.g., a KLARF file or any other standard file format).

Dies are formed on the wafer, and multiple cores are formed in the dies. For example, multi-core architecture puts more than one processor unit onto a single die. However, unlike dies, each of which is potentially a product unto itself, the cores individually do not constitute a product. All cores in a die are designed to have the same functionality. The cores also have the same layout on every layer. The floor plan may vary depending on the architecture design, as will be discussed further herein.

One example of such a floor plan is shown in FIG. 1. In particular, the floor plan shown in FIG. 1 is one example of a floor plan for chips with multi-core architecture. Dies 10 are formed on a wafer (not shown in FIG. 1). Although three dies are shown in FIG. 1, it is to be understood that any suitable number of dies may be formed on the wafer in any suitable arrangement. As shown in FIG. 1, eight cores 12 are packed into one single die 10. However, each of the dies may include any suitable number of cores. In addition, the cores may have any suitable arrangement within each of the dies. For the sake of simplicity, other blocks that may be included in the dies such as cache memory are not shown in FIG. 1 and are believed to impose no obstacles to the implementation of the methods disclosed herein.

As shown in FIG. 1, pattern repetition manifests itself at two different levels. At the wafer level, there exists a die-to-die repetition. Therefore, one wafer may have multiple theoretically identical die formed thereon (e.g., dies having the same design). As such, defect detection can be performed using a die-to-die comparison. At the die level, the multi-core architecture introduces another repetition. In particular, at the die level, there exists a core-to-core repetition. In addition, multiple cores within each die may be theoretically identical (e.g., identical by design). A noticeable difference between the two types of repetition is locality. The core-to-core repetition is much more localized. In particular, since the dies are much larger than the individual cores, the dies are less localized with respect to the wafer than the cores.

The method also includes detecting defects on the wafer by comparing the output for a first of the multiple cores to the output for a second of the multiple cores. The first and second of the multiple cores are formed in the same die, different dies, or the same die and different dies. Although the comparing step includes comparing the output for two of the multiple cores, it is to be understood that the comparing step may include comparing any number of the multiple cores to each other. In addition, each of the multiple cores may be compared to any one of the other multiple cores formed in the same die, different dies, or the same die and different dies for single arbitration defect detection. Alternatively, each of the multiple cores may be compared to more than one of the other multiple cores formed in the same die, different dies, or the same die and different dies for double or multiple arbitration defect detection. Preferably, the cores for which the output is compared are cores that are relatively close to each other on the wafer. For example, as described above, the cores for which the output is compared may be selected to include only cores in the same die thereby ensuring that the distance between the dies is less than the period of the dies. However, in some instances, cores formed in different dies may be spaced apart on the wafer by less than the period of dies. In such instances, the cores for which the output is compared may be cores formed in different dies but spaced apart from each other on the wafer by less than the period of the dies. Selecting cores for which the output will be compared that are formed in a localized area on the wafer is advantageous for reducing the noise in the results of the comparison as described further herein, which advantageously increases the sensitivity of defect detection. The comparing step may be further performed as described herein. In addition, the detecting step may be further performed as described herein. Furthermore, the detecting step can be performed for more than one die on the wafer (e.g., one, some, or all dies formed on a wafer).

As described above, all cores in a die are designed to have the same functionality. In this manner, in one embodiment, the first and second of the multiple cores for which output is compared are homogenous multiple cores. For example, the first and second multiple cores may have the same design although the orientation of the cores and therefore the design on the wafer may or may not be the same as described further herein. In addition, all of the multiple cores in all of the dies formed on the wafer may be homogenous multiple cores.

In one embodiment, the comparing step described above includes comparing substantially an entirety of the first of the multiple cores to substantially an entirety of the second of the multiple cores. For example, as described above, the first and second multiple cores for which the output is compared may be homogenous multiple cores. Therefore, the design of the multiple cores may be essentially the same. As such, substantially the entirety of the multiple cores may be compared as described herein to thereby allow detection of defects in substantially the entirety of the multiple cores.

In one embodiment, noise in results of the comparing step caused by process variations across the wafer is substantially suppressed due to periodicity of the multiple cores. For example, the locality of a repetition can be quantitatively represented by the dimension of its period. Referring back to FIG. 1, along the horizontal x-axis, the core-to-core repetition has period 14 of S, while die pitch 16 is S'. The statement that the core-to-core repetition is much more localized simply reflects the fact that S is multiple times smaller than S', i.e., S<<S'. The industry trend is to double the number of cores within a chip every generation. As more and more cores are put into one die, the disparity between core-to-core repetition and die-to-die repetition in locality is expected to become even larger in the future. By taking advantage of the locality of core-to-core repetition, defect inspection performed as described herein could achieve greater capability of suppressing the noise caused by process variation. As further shown in FIG. 1, the cores have period 18 along the vertical y-axis. In addition, the cores shown in FIG. 1 have x-x mirror symmetry. In particular, the cores on one side of plane 20 have x-x mirror symmetry with the cores on the opposite side of plane 20.

Process variation has been known for a long time to be a limiting factor of inspection sensitivity. Every process exhibits some degree of variation. Process variation can be either controllable or uncontrollable. A controllable variation may become uncontrollable as device scaling reaches a certain point. Process variation can be tolerable (within spec) or intolerable (out-of-spec). Detection of relatively small defects requires suppression of the background noise from both "tolerable" and intolerable variations.

In one embodiment, noise in results of the comparing step caused by color variations across the wafer is substantially suppressed due to periodicity of the multiple cores. For example, one of the process variations whose impact on defect inspection has attracted wide attention is so-called color variation. Commonly observed after the chemical-mechanical polishing (CMP) process, the root cause of color variation is usually dielectric film non-uniformity. Commonly used film thickness measurement techniques include spectroscopic ellipsometry (SE), atomic force microscopy (AFM), and high-resolution profiling (HRP). SE has a relatively large spot size and is typically used to map the thickness globally. AFM and HRP have a relatively high spatial resolution and are able to resolve fine pattern structures. The total thickness variation can be determined as the sum of the global component as measured by SE and the local component as obtained by AFM or HRP. The total oxide loss at any point, for example, is typically defined as the oxide reduction in a relatively open area plus the oxide erosion at the point in question. As dishing and erosion are minimized through consumable engineering and process optimization, the total oxide loss is more likely dominated by global variation. Shown in FIG. 2 is an optical image of two adjacent dies 22 and 24 after a copper CMP process. The optical images of a surface after a copper CMP process shown in FIG. 2 show relatively severe die-to-die color variation. For example, as shown in FIG. 2, the die-to-die color variation is salient, while within die color variation is subdued substantially. This color variation reflects the general observation that process variation tends to be larger from die-to-die. A plausible explanation is that variance is additive given that the sources of variation are independent. Core-based inspection can substantially reduce the interference of the global variation component with defect detection because the locality of core repetition enables greater proximity of the target intended and reference used. As the number of cores in a die grows, the ever larger disparity in the locality is expected to offer core-based inspection even greater noise suppression capability and defect detection sensitivity.

Core-based inspection differs from partial die inspection, even though the inspected area might be the same. In partial die inspection, the comparison must be made with the reference to a different die, possibly an adjacent die. The distance between an inspection point and a reference point as shown in FIG. 1 must be $\geq$S'. The relatively large spatial distance is translated into potentially larger process variation, which may lead to potential degradation of signal-to-noise ratio and therefore inferior inspection sensitivity.

In one embodiment, the first and second of the multiple cores for which the output is compared are formed in a die located adjacent to an edge of the wafer. In one such embodiment, only a portion of the die located adjacent to the edge of the wafer is formed on the wafer. In one such embodiment, detecting the defects includes detecting the defects in the die located adjacent to the edge of the wafer. For example, in addition to enhanced sensitivity, core-based inspection enables edge die inspection as well. The relentless effort to enlarge the wafer size sees more and more die adjacent to the wafer edge. From a defect control and process diagnosis point of view, it is desirable to make available information about the defects located in the edge die, whether or not the edge die is fully printed on the wafer. FIG. 3 shows wafer edge 26 presumably running across die 28 with multi-core architecture. As shown in FIG. 3, the edge die is incomplete. In other words, die 28 as formed on the wafer (not shown in FIG. 3) will include only a portion of cores 30 and 32, but an entirety of other cores 34. In contrast, die 36 formed adjacent to die 28 is complete in that die 36 includes all eight cores 38 on the wafer. Therefore, the edge die is not inspectable in accordance with previously used inspection methods. However, there are still six complete cores within this die. Thus, core-based inspection disclosed herein is still possible for the portion of the edge die that includes completely formed cores.

Core-based inspection distinguishes itself from array mode inspection in selection, identification, and utilization of repetitive patterns. An observation that the embodiments described herein are based on is that all repetitive patterns are not equally useful from the wafer inspection point of view. A repetitive pattern can be characterized with two parameters: the dimension of its period (A) and the number that the pattern is repeated ($\eta$). For any specific repetitive pattern, the product of the two parameters: ($\eta$A) defines the largest possible covered (inspectable) area if this specific pattern is used for inspection. Normalization of the product ($\eta$A) against die area defines in turn the maximum inspection coverage that a specific repetitive pattern is capable of. Random inspection, where A=die area and $\eta$=number of die on a wafer, has 100% coverage. The importance of inspection coverage to the potential inspection value can be understood through a simplified case. Consider random defect limited yield, which was extensively discussed in the book entitled "Microelectronics Manufacturing Diagnostics Handbook" edited by Liandzberg, which is incorporated by reference as if fully set forth herein. The potential yield loss due to random defects follows a Poisson distribution and drops exponentially with shrinkage of the area concerned, which suggests that the potential yield impact of an inspection diminishes rapidly with the dwindling inspection coverage. An inspection is meaningless unless it is able to provide reasonable coverage. Although repetitive patterns are plenty in modern IC chips, the coverage requirement precludes many patterns from being practically useful for inspection purposes. Thus, the candidates must be selected from repetitive patterns that could provide adequate coverage.

Array mode inspection has been largely restricted to repetitive patterns that are relatively small but highly repeatable such as memory devices, as schematically shown in FIG. 4. In particular, FIG. 4 illustrates the positioning of different inspection approaches as a function of $\eta$ along the x-axis and A along the y-axis. As shown in FIG. 4, as $\eta$ decreases, the difficulty of identification of repetitive patterns that are suitable for inspection increases. In addition, as A decreases, the locality of repetitive patterns that are suitable for inspection increases. The gray scale shown in FIG. 4 represents the possible coverage of the different inspection approaches. Memory typically occupies a significant portion of silicon real estate and thus provides adequate coverage. Moreover, the repetitive patterns exhibited by memory array are easy to identify. Identification of a repetitive pattern in general, however, is non-trivial. For example, identifying a repetitive pattern may be daunting because it must be ascertained that the underlying layers possess the same periodicity as the current layer since the underlying layers may also participate in image formation during inspection of the current layer. Therefore, although array type inspection may include comparison of output for repetitive patterns that are located relatively close together on the wafer, and therefore may not suffer from the noise caused by process variations in die-to-die based comparisons, the selection of the repetitive patterns for which the output will be compared must be based on the underlying patterns such that the underlying patterns will not contribute to noise in the results of the comparison steps.

Unlike core-based architecture, therefore, in which patterned features formed under each of the cores being inspected are theoretically identical (i.e., identical by design), the patterned features formed under repetitive patterns of memory type architecture may not be the same and therefore have to be determined such that the repetitive patterns that can be compared can be identified. Therefore, in one embodiment, results of the comparing step are independent of patterned features formed on a layer of the wafer underlying a layer of the wafer on which the defects are being detected. For example, multi-core architecture provides an opportunity to identify a repetitive pattern without the need to consult with the detailed (multi-layer) layout. In particular, the patterns formed on layers underlying each of the multiple cores in the dies will generally be the same. Therefore, the portions of the multiple cores that can be inspected in the methods described herein will generally not be limited by the underlying patterns, and the underlying patterns will not contribute to noise in the results of the comparing step.

In addition, the multiple cores have a period in the dies greater than a period of repetitive patterned features formed in the dies. In this manner, core-based inspection may employ a repetitive pattern with relatively large dimension of period but relatively small number of repetition, which is characteristically opposite to memory structures that the array mode is accustomed to, as shown schematically in FIG. 4. In other words, the multiple cores formed on the wafer are theoretically identical and repetitive, but not repetitive in the traditional way.

In one embodiment, the comparing step described herein is not performed based on periodicity and repeatability of patterned features formed in the multiple cores. For example, as described above, the comparing step may include comparing substantially an entirety of the first of the multiple cores to substantially an entirety of the second of the multiple cores. In this manner, the comparing step may be performed regardless of the period and repetition of the patterned features in the multiple cores. Because of the fact that the number of repetition is low, the utilization is crucial to the implementation of core-based inspection. Thus, it is desirable to be able to make use of the repetition no matter how the pattern is repeated. Another aspect of the embodiments described herein is therefore to provide a method to enhance the utilization of pattern repetition.

Figure 5:
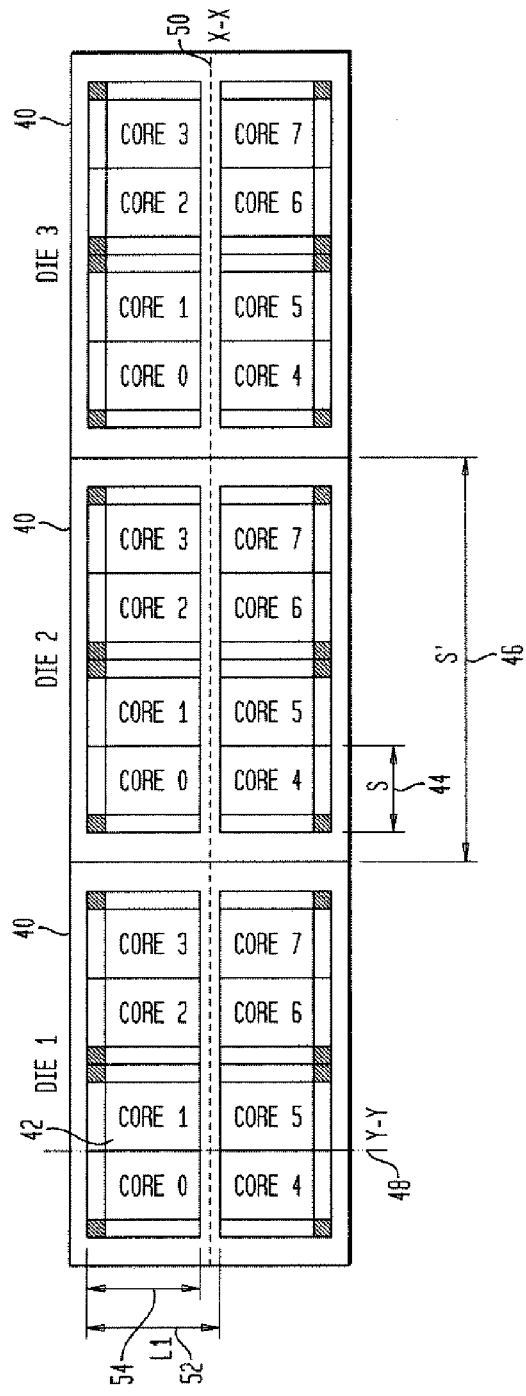
FIG. 5 is a schematic diagram illustrating a top view of another example of a floor plan of multiple dies formed on a wafer and multiple cores formed in the dies.

In one embodiment, the first and second of the multiple cores for which the output is compared are not located adjacent to each other in the same die. In another embodiment, the method includes rotating the output for one of the first and second of the multiple cores prior to the comparing step. In an additional embodiment, the method includes translating the output for one of the first and second of the multiple cores prior to the comparing step. For example, within-die repetition could take two basic forms, translational and rotational. FIG. 5 illustrates another example of a floor plan of a die with multi-core architecture. In particular, FIG. 5 shows a chip floor plan of multi-core architecture with mirror symmetry. As shown in FIG. 5, dies 40 formed on a wafer (not shown in FIG. 5) include cores 42. Although three dies are shown in FIG. 5 in one particular arrangement, it is to be understood that any suitable number of dies may be formed on the wafer in any suitable arrangement. In addition, although eight cores are shown in FIG. 5 in one particular arrangement in each of the dies, it is to be understood that any suitable number of cores may be formed in the dies in any suitable arrangement. As further shown in FIG. 5, period 44 of the cores is S, and period 46 of the dies is S'.

A translational repetition can be identified with a period of 2S along the horizontal (x) axis, such as between core 0 and core 2. This repetition is superimposed on the die-to-die repetition which has a period of S'. On the other hand, a rotational repetition can be identified by locating imaginary mirror planes 48 and 50 between adjacent cores within a die, such as mirror plane y-y between core 0 and core 1; mirror plane x-x between core 0 and core 4, etc. (The floor plan in FIG. 1 also possesses x-x mirror symmetry.)

In one embodiment, the method includes rotating and translating the output for one of the first and second of the multiple cores prior to the comparing step. For example, a derivative repetition is possible through a combination of rotational and translational operations. For example, if an imaginary rotation axis runs perpendicular to the surface of the paper, a combined operation of an 180° clockwise rotation plus a translational shift of S along the x-axis and L1 along the y-axis (shown as translational shift 52 in FIG. 5, which is different than dimension 54 of the cores in the y direction) would repeat core 0 at core 5. The same repetition can also be achieved by performing sequential mirror operations along mirror plane x-x and mirror plane y-y.

Multi-core architecture invokes pairing of cores in the manner of mirror symmetry, as the resultant floor plan has the potential to render greater circuit efficiency through elimination of redundancy. In order for core-based inspection to be applicable no matter how the pattern is repeated, it is desirable to accommodate the mirror symmetry in the inspection capability. Unlike die-based or array mode inspection in which mirror symmetry capability is unavailable and unnecessary, the application of core-based inspection may be limited without this capability. In particular, by rotating and/or translating one of the multiple cores such that the output for that multiple core can be compared to another of the multiple cores, the combinations of the multiple cores that can be compared for defect detection increases thereby increasing the flexibility of inspection and the area in which defects can be detected.

Figure 6:
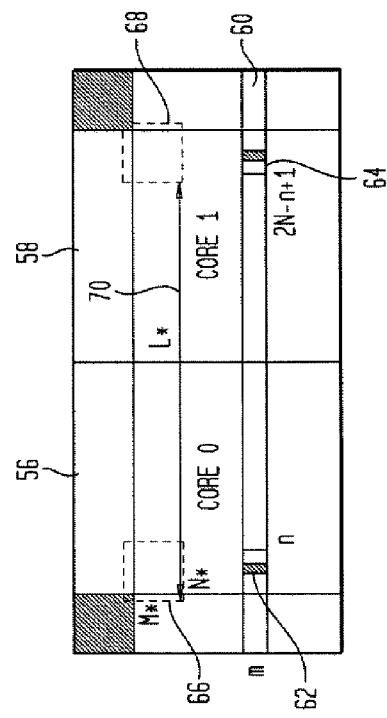
FIG. 6 is a schematic diagram illustrating a top view of one embodiment of inspection of multiple cores with mirror symmetry.

In one embodiment, the output includes digitized images of the wafer. In another embodiment, the comparing step includes comparing individual pixels in the output for the first and second of the multiple cores to each other. In one such embodiment, the individual pixels that are compared to each other are located at corresponding positions across a plane of mirror symmetry between the first and second of the multiple cores. FIG. 6 shows a schematic example of inspection of cores 56 and 58 with mirror symmetry. In accordance with the embodiments described herein, a comparison of two digitized images with mirror symmetry can be performed as follows. Assume that the image of a core is digitized into a matrix of M×N. Referring to FIG. 6, $$N = \frac{S}{PixelSize} \quad (1)$$

-continued $$M = \frac{L}{PixelSize}$$

where the pixel size is chosen such that M, N=integral. In one embodiment, the first and second of the multiple cores are located adjacent to each other in the same die. For example, if $m^{th}$ row 60 encompasses two adjacent cores, such as core 0 and core 1, information content within each pixel of the corresponding 2N pixels in the $m^{th}$ row will be generated and stored. The mirror symmetry relative to the mirror plane y-y calls for the equality of the first pixel and pixel 2N; the second to 2N−1; ... and finally pixel N with pixel N+1. In general, $n^{th}$ pixel 62 located in core 0 should be equal to pixel 2N−n+1 (indicated as pixel 64 in FIG. 6) situated in core 1. Let (m,n) be the information content of the corresponding pixel. Consider an image subtraction such as follows:

$$[(m,1)-(m,2N); \ldots ; (m,n)-(m,2N-n+1); \ldots ; (m,N)-(m,N+1)] \quad (2)$$

where m=1, ..., M. The result is a matrix of M×N after image subtraction. In one embodiment, detecting the defects includes applying a threshold to results of the comparing step. For example, an anomaly or a possible defect candidate could be identified if the intensity of a resulting pixel is over a certain threshold. Thus, Equation (2) provides a method of wafer inspection for cores with mirror symmetry. It is to be understood that Equation (2) is based on the assumption that the mirror plane is known as the plane separating pixel N and pixel N+1 and the cores of mirror symmetry are adjacent to each other. In the case in which the location of the plane of mirror symmetry is unknown, the mirror plane can be determined through a method described further herein.

In one embodiment, the method includes filtering the output prior to the comparing step using a filtering technique that has substantially the same symmetry as the multiple cores. For example, if the output for two multiple cores that are rotationally symmetric will be compared to each other as described herein, the filtering may be performed to account for such rotational symmetry. In this manner, widely used filtering techniques such as 2D convolution are applicable under certain circumstances. Consider a 3×3 filtering matrix. For the sake of simplicity, let is be center symmetric.

$$\begin{bmatrix} \gamma & \beta & \gamma \\ \beta & \alpha & \beta \\ \gamma & \beta & \gamma \end{bmatrix} \quad (3)$$

If we apply this filter to the corresponding pixel arrays in a target core and a reference core, respectively, $$\begin{bmatrix} (m+1, n-1) & (m+1, n) & (m+1, n+1) \\ (m, n-1) & (m, n) & (m, n+1) \\ (m-1, n-1) & (m-1, n) & (m-1, n+1) \end{bmatrix}; \quad (4)$$

$$\begin{bmatrix} (m+1, 2N-n) & (m+1, 2N-n+1) & (m+1, 2N-n+2) \\ (m, 2N-n) & (m, 2N-n+1) & (m, 2N-n+2) \\ (m-1, 2N-n) & (m-1, 2N-n+1) & (m-1, 2N-n+2) \end{bmatrix}$$

An examination of the scalar product leads us to the following equation:

$$\alpha(m,n)+\beta[(m-1,n)+(m+1,n)+(m,n-1)+(m,n+1)]+$$

$$\gamma[(m-1,n-1)+(m-1,n+1)+(m+n-1)+(m+1,n+2)]=$$

$$\alpha(m,2N-n+1)+\beta[m-1,2N-n+1)+(m+1,2N-n+1)+(m,2N-n)+(m,2N-n+2)]+$$

$$\gamma[m-1,2N-n)+(m-1,2N-n2)+(m+1,2N-n)+(m+1,2N-n+2)] \quad (5)$$

since mirror symmetry requires the following equations.

$$(m,n)=(m,2N-n+1)$$

$$(m,n-1)=(m,2N-n+2)$$

$$(m,n+1)=(m,2N-n)$$

$$(m-1,n)=(m-1,2N-n+1)$$

$$(m+1,n)=(m+1,2N-n+1)$$

$$(m-1,n+1)=(m-1,2N-n+2)$$

$$(m-1,n+1)=(m-1,2N-n)$$

$$(m+1,n-1)=(m+1,2N-n+2)$$

$$(m+1,n+1)=(m+1,2N-n) \quad (6)$$

Equation (5) demonstrates that the application of a filtering matrix of center symmetry will introduce no distortion to the resultant subtraction image. This statement can be extended in general as long as the filtering matrix is of mirror symmetry. The filtering that may be performed in the embodiments described herein may include any suitable filtering such as filtering noise.

Inspection of repetitive patterns with mirror symmetry may take into consideration inspection system design and application. For example, an illumination laser beam in an inspection system may assume an elliptical shape on the wafer depending on incident obliqueness, and the intensity of the laser beam may follow a Gaussian distribution along the orthogonal axis. If the distribution is not perfectly symmetric or the axis of the ellipsoid is not aligned perfectly with the axis of the mirror plane, the effect of non-uniform illumination might be reinforced instead of canceled out after image subtraction performed based on Equation (2). This effect can be examined by investigating the dependence of the results of the comparing step upon the scanning direction relative to the axis of the mirror plane.

In one embodiment, the method includes identifying a plane of mirror symmetry between the first and second of the multiple cores prior to the comparing step and aligning the first and second of the multiple cores to each other based on the plane of mirror symmetry prior to the comparing step. For example, defect inspection sensitivity is to a certain extent determined by the precision of image alignment. A defect smaller than the misalignment is generally deemed undetectable. There are many ways to determine the best alignment, such as linear regression used in a system where the target and the reference portions of a wafer are simultaneously scanned. For inspection of patterns of mirror symmetry, minimization of misalignment may be performed by substantially precise determination of the mirror plane. Consider the following steps to locate a mirror plane in a pixilated image. Referring back to FIG. 6, first, choose pixel array 66 of size M'×N' within one core (say the target) and anchor it. Find its counterpart 68 having similar features on the reference core of mirror symmetry. Estimate distance 70 (L*) between the two separate image portions. Second, compute the sum of the squares of the difference images.

$$\sum_{\substack{m,m^*=1,M' \\ n=1,N'}} [(m,n)-(m^*,2N^*-n+1)]^2 \quad (7)$$

where (m,n) and (m*,2N*-n+1) represent the information content of the corresponding pixels of the target and reference images, respectively. The definition of m* and N* indicates the shift between the two image portions.

$$m^* = m, m \pm 1, m \pm 2, m \pm 3, \ldots \quad (8)$$

$$2N^* = \frac{L^*}{PixelSize}, \frac{L^*}{PixelSize} \pm 1, \frac{L^*}{PixelSize} \pm 2, \ldots$$

The computation reiterates for each of the possible shifts in the vicinity of the estimated position, until Equation (7) finds its minimal point. Third, let N=N* where N* is the number at which Equation (7) is minimal. The mirror plane is then N pixels away from the anchor point. It is noted that this procedure applies even if the two cores of mirror symmetry are not adjacent to each other such as the imaginary mirror plane x-x in FIG. 5. The pixel size and the estimated distance L* are preferably selected such that N* is always integral (the number of pixels within the distance are an even number). In this way, the mirror plane is running between instead of across pixels. Obviously the precision of determining the mirror plane location is dependent on the pixel size, and the residual misalignment error can be minimized through reduction of the pixel size.

Each of the embodiments of the method described above may include any other step(s) of any other method(s) described herein. Furthermore, each of the embodiments of the method described above may be performed by any of the systems described herein.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. For example, after the method detects the defects, the method may include displaying information about the defects to a user. Furthermore, the results may be stored "permanently" "semi-permanently," temporarily, or for some period of time. For example, the storage medium may be random access memory (RAM), and the results may not necessarily persist indefinitely in the storage medium.

Figure 7:
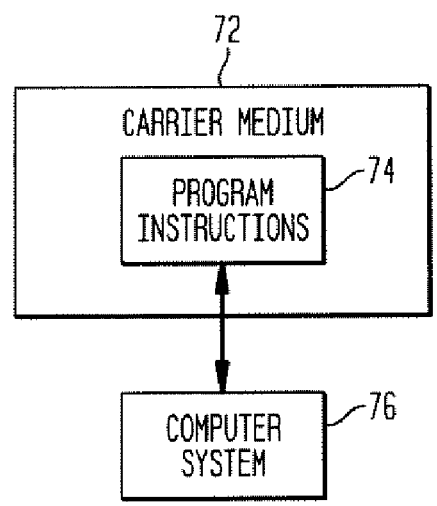
FIG. 7 is a block diagram illustrating one embodiment of a carrier medium that includes program instructions executable on a computer system for performing one or more of the computer-implemented methods described herein.

An additional embodiment relates to a carrier medium that includes program instructions executable on a computer system for performing a computer-implemented method for detecting defects on a wafer. One such embodiment is shown in FIG. 7. In particular, as shown in FIG. 7, carrier medium 72 includes program instructions 74 executable on computer system 76.

The computer-implemented method includes acquiring output for the wafer generated by an inspection system.

Acquiring the output for the wafer may be performed as described herein. Dies are formed on the wafer, and multiple cores are formed in the dies. The dies and the multiple cores may be configured as described herein. The method also includes detecting defects on the wafer by comparing the output for a first of the multiple cores to the output for a second of the multiple cores. The first and second of the multiple cores are formed in the same die, different dies, or the same die and different dies. Detecting the defects and comparing the output may be performed as described herein. The computer-implemented method for which the program instructions are executable may include any other step(s) described herein.

Program instructions 74 implementing methods such as those described herein may be transmitted over or stored on carrier medium 72. The carrier medium may be a transmission medium such as a wire, cable, or wireless transmission link. The carrier medium may also be a storage medium such as a read-only memory, a random access memory, a magnetic or optical disk, or a magnetic tape.

The program instructions may be implemented in any of various ways, including procedure-based techniques, component-based techniques, and/or object-oriented techniques, among others. For example, the program instructions may be implemented using ActiveX controls, C++ objects, Java-Beans, Microsoft Foundation Classes ("MFC"), or other technologies or methodologies, as desired.

The computer system may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer system may also include any suitable processor known in the art such as a parallel processor. In addition, the computer system may include a computer platform with high speed processing and software, either as a standalone or networked tool.

Figure 8:
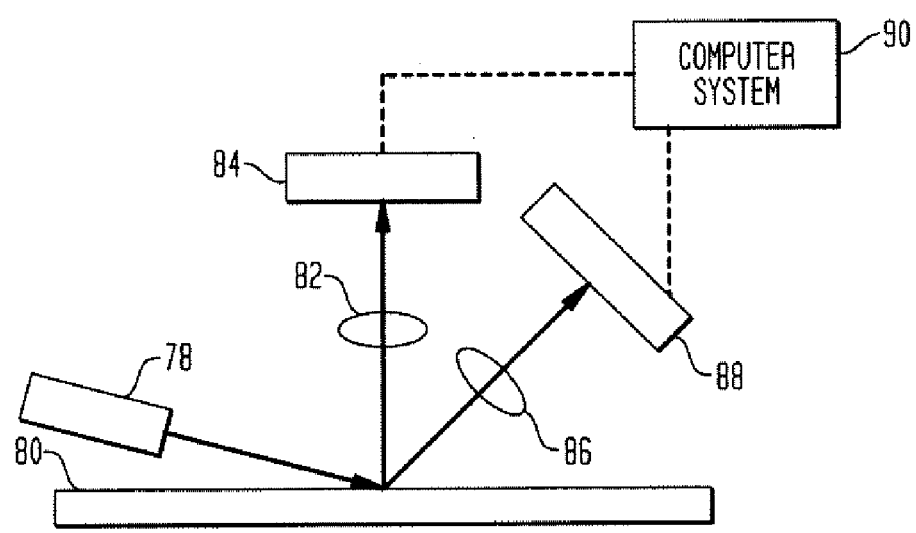
FIG. 8 is a schematic diagram illustrating a system configured to detect defects on a wafer.

Another embodiment relates to a system configured to detect defects on a wafer. One embodiment of such a system is shown in FIG. 8. The system includes an inspection system configured to generate output for the wafer. For example, as shown in FIG. 8, the inspection system includes light source 78. Light source 78 may include any suitable light source known in the art such as a laser. Light source 78 is configured to direct light to wafer 80 at an oblique angle of incidence, which may include any suitable oblique angle of incidence. The wafer may be configured as described herein. For example, dies (not shown in FIG. 8) are formed on wafer 80, and multiple cores (not shown in FIG. 8) are formed in the dies.

The inspection system may also include one or more optical components (not shown) that are configured to direct light from light source 78 to wafer 80. The optical components may include any suitable optical components known in the art such as, but not limited to, a polarizing component. In addition, the light source and/or the one or more optical components may be configured to direct the light to the wafer at one or more angles of incidence (e.g., an oblique angle of incidence and/or a substantially normal angle of incidence).

Light scattered from wafer 80 may be collected and detected by multiple channels of the inspection system. For example, light scattered from wafer 80 at angles relatively close to normal may be collected by lens 82. Lens 82 may include a refractive optical element as shown in FIG. 8. In addition, lens 82 may include one or more refractive optical elements and/or one or more reflective optical elements.

Light collected by lens 82 may be directed to detector 84. Detector 84 may include any suitable detector known in the art such as a charge coupled device (CCD) or another type of imaging detector. Detector 84 is configured to generate output for the wafer (e.g., output that is responsive to the light scattered from the wafer). Therefore, lens 82 and detector 84 form one channel of the inspection system. This channel of the inspection system may include any other suitable optical components (not shown) known in the art such as a polarizing component. Therefore, the output generated by the inspection system for the wafer may include the output generated by detector 84. For example, a processor (not shown) of the inspection system may be configured to acquire the output generated by the detector for the wafer.

Light scattered from wafer 80 at different angles may be collected by lens 86. Lens 86 may be configured as described above. Light collected by lens 86 may be directed to detector 88, which may be configured as described above. Detector 88 is also configured to generate output for the wafer (e.g., output that is responsive to the light scattered from the wafer). Therefore, lens 86 and detector 88 may form another channel of the inspection system. This channel may also include any other optical components described above. In some embodiments, lens 86 may be configured to collect light scattered from the wafer at polar angles from about 20 degrees to about 70 degrees. In addition, lens 86 may be configured as a reflective optical element (not shown) that is configured to collect light scattered from the wafer at azimuthal angles of about 360 degrees. Therefore, the output generated by the inspection system for the wafer may include the output generated by detector 88.

The inspection system shown in FIG. 8 may also include one or more other channels. For example, the inspection system may include an additional channel (not shown), which may include any of the optical components described herein, configured as a side channel. In one such example, the side channel may be configured to collect and detect light that is scattered out of the plane of incidence (e.g., the side channel may include a lens that is centered in a plane that is substantially perpendicular to the plane of incidence and a detector configured to detect light collected by the lens). Therefore, the output generated by the inspection system for the wafer may include the output generated by a detector of the side channel.

The system also includes computer system 90. Output generated by the detectors may be provided to computer system 90. For example, the computer system may be coupled to each of the detectors (e.g., by one or more transmission media shown by the dotted lines in FIG. 8, which may include any suitable transmission media know in the art) such that the computer system may receive the output generated by the detectors. The computer system may be coupled to each of the detectors in any suitable manner.

The computer system is configured to detect defects on the wafer by comparing the output for a first of the multiple cores to the output for a second of the multiple cores. The first and second of the multiple cores are formed in the same die, different dies, or the same die and different dies. The output that is compared to detect the defects may include output acquired by any one or more channels of the inspection system. The output that is compared to detect the defects may vary depending on, for example, the types of defects that are being detected on the wafer (e.g., the defects of interest). The computer system may be configured to detect the defects and to compare the output as described further herein.

The computer system may be configured to perform any other step(s) of any method embodiment(s) described herein.

The computer system may be further configured as described herein. The inspection system may also be further configured as described herein. Furthermore, the system may be further configured as described herein.

It is noted that FIG. 8 is provided herein to generally illustrate one configuration of an inspection system that may be included in the system embodiments described herein. Obviously, the inspection system configuration described herein may be altered to optimize the performance of the inspection system as is normally performed when designing a commercial inspection system. In addition, the systems described herein may be implemented using an existing inspection system (e.g., by adding functionality described herein to an existing inspection system) such as the Puma 9000 and 9100 series of tools that are commercially available from KLA-Tencor, San Jose, Calif. For some such systems, the methods described herein may be provided as optional functionality of the system (e.g., in addition to other functionality of the system). Alternatively, the system described herein may be designed "from scratch" to provide a completely new system.

In some embodiments, a system configured to perform one or more of the computer-implemented methods described herein may include an inspection system such as that described above. However, a system that is configured to perform one or more of the computer-implemented methods described herein may not include an inspection system. For example, the system may include one or more processors or one or more computer systems configured as a stand alone tool. In one such example, the system may include one or more components that are specifically designed (and optionally dedicated) to performing one or more of the computer-implemented methods described herein.

Further modifications and alternative embodiments of various aspects of the invention may be apparent to those skilled in the art in view of this description. For example, computer-implemented methods, carrier media, and systems for detecting defects on a wafer based on multi-core architecture are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A computer-implemented method for detecting defects on a wafer, comprising:
   acquiring output for the wafer generated by an inspection system, wherein dies are formed on the wafer, wherein multiple cores are formed in the dies, and wherein the multiple cores have a period in the dies greater than a period of repetitive patterned features formed in the dies; and
   detecting defects on the wafer by comparing the output for a first of the multiple cores to the output for a second of the multiple cores, wherein the first and second of the multiple cores are formed in the same die, different dies, or the same die and different dies.

2. The method of claim 1, wherein the first and second of the multiple cores are located adjacent to each other in the same die.

3. The method of claim 1, wherein the first and second of the multiple cores are not located adjacent to each other in the same die.

4. The method of claim 1, wherein the first and second of the multiple cores are homogenous multiple cores.

5. The method of claim 1, wherein said comparing comprises comparing substantially an entirety of the first of the multiple cores to substantially an entirety of the second of the multiple cores.

6. The method of claim 1, wherein said comparing is not performed based on periodicity and repeatability of patterned features formed in the multiple cores.

7. The method of claim 1, wherein results of said comparing are independent of patterned features formed on a layer of the wafer underlying a layer of the wafer on which the defects are being detected.

8. The method of claim 1, wherein noise in results of said comparing caused by process variations across the wafer is substantially suppressed due to periodicity of the multiple cores.

9. The method of claim 1, wherein noise in results of said comparing caused by color variations across the wafer is substantially suppressed due to periodicity of the multiple cores.

10. The method of claim 1, wherein the first and second of the multiple cores are formed in a die located adjacent to an edge of the wafer, wherein only a portion of the die located adjacent to the edge of the wafer is formed on the wafer, and wherein said detecting comprises detecting the defects in the die located adjacent to the edge of the wafer.

11. The method of claim 1, further comprising rotating the output for one of the first and second of the multiple cores prior to said comparing.

12. The method of claim 1, further comprising translating the output for one of the first and second of the multiple cores prior to said comparing.

13. The method of claim 1, further comprising rotating and translating the output for one of the first and second of the multiple cores prior to said comparing.

14. The method of claim 1, further comprising filtering the output prior to said comparing using a filtering technique that has substantially the same symmetry as the multiple cores.

15. The method of claim 1, further comprising identifying a plane of mirror symmetry between the first and second of the multiple cores prior to said comparing and aligning the first and second of the multiple cores to each other based on the plane of mirror symmetry prior to said comparing.

16. The method of claim 1, wherein the output comprises digitized images of the wafer.

17. The method of claim 1, wherein said comparing comprises comparing individual pixels in the output for the first and second of the multiple cores to each other, and wherein the individual pixels that are compared to each other are located at corresponding positions across a plane of mirror symmetry between the first and second of the multiple cores.

18. The method of claim 1, wherein said detecting comprises applying a threshold to results of said comparing.

19. A carrier medium, comprising program instructions executable on a computer system for performing a computer-implemented method for detecting defects on a wafer, wherein the computer-implemented method comprises:
   acquiring output for the wafer generated by an inspection system, wherein dies are formed on the wafer, wherein multiple cores are formed in the dies, and wherein the multiple cores have a period in the dies greater than a period of repetitive patterned features formed in the dies; and detecting defects on the wafer by comparing the output for a first of the multiple cores to the output for a second of the multiple cores, wherein the first and second of the multiple cores are formed in the same die, different dies, or the same die and different dies.

20. A system configured to detect defects on a wafer, comprising:

an inspection system configured to generate output for the wafer, wherein dies are formed on the wafer, wherein multiple cores are formed in the dies, and wherein the multiple cores have a period in the dies greater than a period of repetitive patterned features formed in the dies; and a computer system configured to detect defects on the wafer by comparing the output for a first of the multiple cores to the output for a second of the multiple cores, wherein the first and second of the multiple cores are formed in the same die, different dies, or the same die and different dies.

* * * * *